April 25, 1967  G. E. OLSSON  3,315,797
PROTECTIVE SHEATH FOR FEVER THERMOMETERS
Filed Oct. 18, 1965  2 Sheets-Sheet 1

INVENTOR
GUSTAF EMIL OLSSON

BY Brumbaugh, Free, Graves & Donohue
his ATTORNEYS

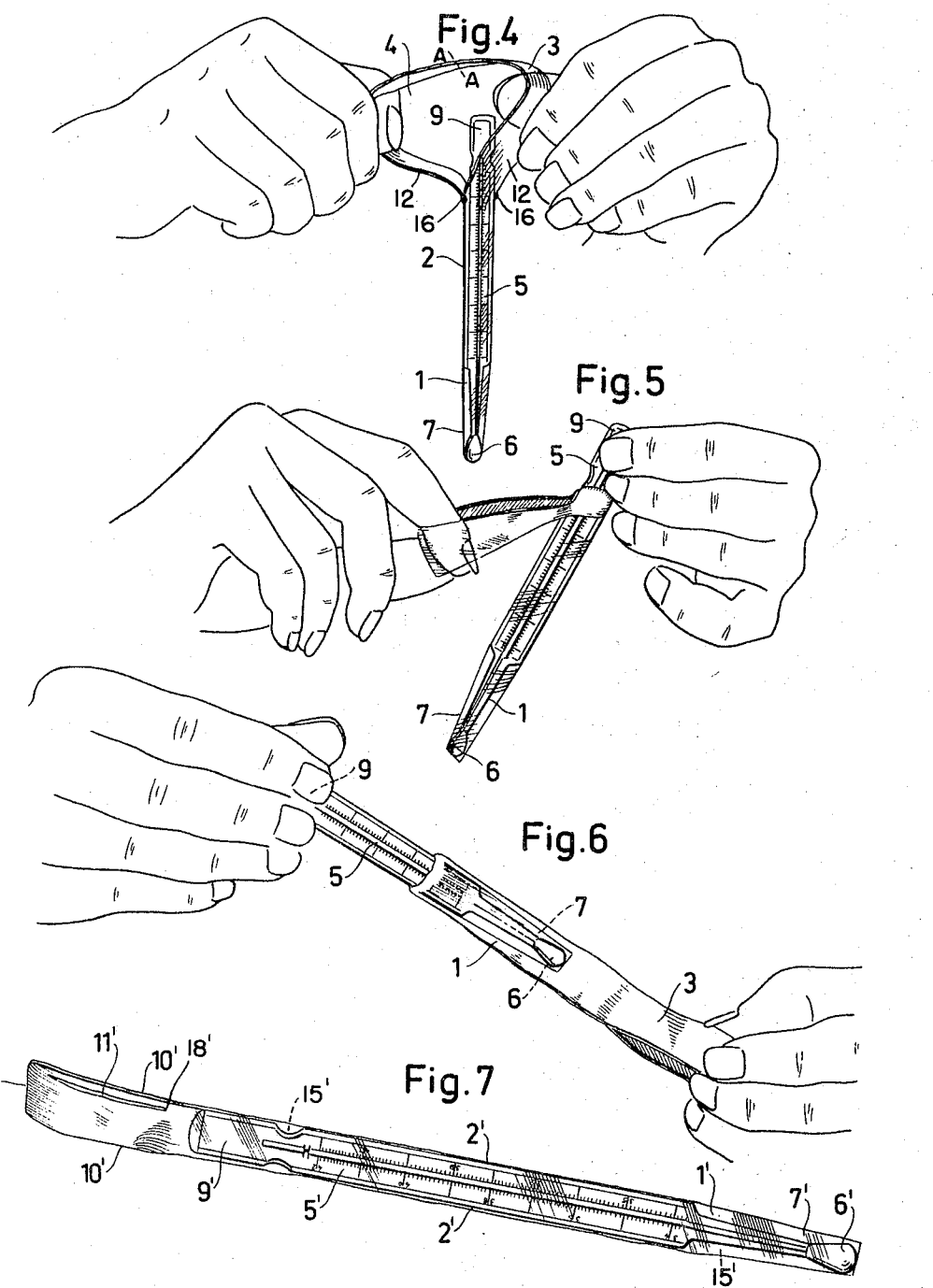

United States Patent Office 3,315,797
Patented Apr. 25, 1967

3,315,797
PROTECTIVE SHEATH FOR FEVER
THERMOMETERS
Gustaf Emil Olsson, Varberg, Sweden, assignor to Axel Kistner Aktiebolaget, Stockholm, Sweden, a Swedish company
Filed Oct. 18, 1965, Ser. No. 497,226
Claims priority, application Sweden, Oct. 20, 1964,
12,610/64
14 Claims. (Cl. 206—16.5)

The present invention relates to protective sheaths for thermometers, and more particularly to disposable protective sheaths.

Disposable sheaths for thermometers are highly advantageous, inasmuch as they protect against the transmission of disease. Moreover, these sheaths obviate the necessity for sterilizing a thermometer after each use.

One version of sheaths of the prior art comprises a body having an open end and a closed end, the open end being formed with a V-shaped notch to facilitate the removal of a thermometer from the sheath. However, with this arrangement, the sheath is removed from the thermometer only with considerable effort which may result in the thermometer touching the contaminated surface of the sheath.

Another prior art sheath includes a means for inverting the sheath progressively from the closed forward end of the sheath up to its open rear end. More specifically, a thread is fixed within the cavity portion of the sheath to the closed end of the sheath body and extends outwardly beyond the open end of the sheath. After a patient's temperature is read, the thread and thermometer are pulled rearwardly to invert the sheath. This sheath structure has a drawback in that it is difficult for hospital personnel to initially invert the lower end of the sheath. Furthermore, the handle portion of the thermometer must be partly uncovered during the process of removal which presents the risk that contaminated parts of the sheath will engage the thermometer.

Still other sheaths are constructed so that when the thermometer is inserted into the sheath, the handle portion of the thermometer extends beyond the rear end of the sheath. The disadvantage of this construction is again the possibility that the thermometer may be contaminated by contacting the exterior surface of the sheath.

In view of the foregoing, it is an object of this invention to provide a sheath which is easily removable from a thermometer and which provides for complete assurance that the contaminated parts of the sheath will not come into contact with the thermometer or the nurse's hand during the process of removal.

In accordance with the present invention, a protective sheath for thermometers is provided which is adapted to be removed from an inserted thermometer by being progressively stripped off from the handle end towards the temperature sensitive ball end of the thermometer, without contaminating the thermometer.

More particularly in one exemplary embodiment, the sheath is provided with closed forward and rearward ends, the forward end being contiguous to the temperature sensitive ball end of an inserted thermometer, and preferably contoured so as to adhere to the thermometer to prevent the thermometer from being unexpectedly withdrawn from the sheath during removal. The closed rear end of the sheath, in the form of a loop, extends some distance beyond the handle of an inserted thermometer, the latter being disposed completely within a thermometer cavity. In removing the sheath from the thermometer, the loop is spread apart and the handle of the thermometer uncovered, then after the handle is grasped, the loop end is inverted and pulled downwardly, progressively stripping off the sheath from the thermometer.

For a more complete understanding of the invention, reference may be had to the following detailed description taken in conjunction with the figures of the accompanying drawings, in which.

FIGURES 4, 5, and 6 show various steps in the operation of removing the sheath from the thermometer; and FIGURE 7 is a perspective view illustrating another version of protective sheath embodying the invention and showing a thermometer completely inserted therein.

Figure 1:
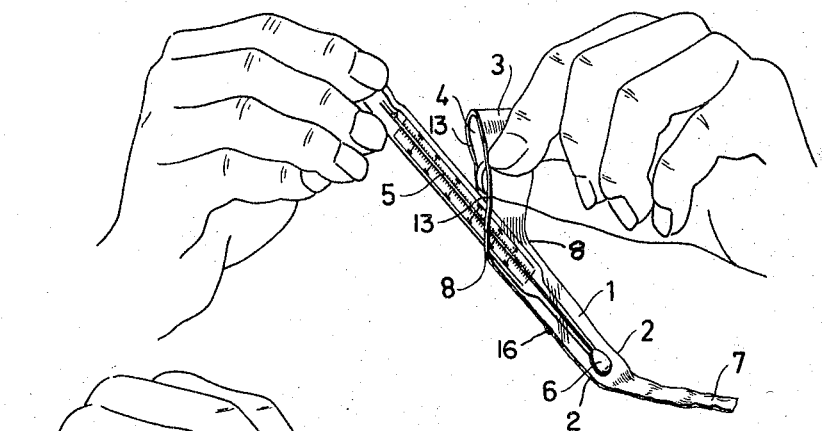
FIGURE 1 is a perspective view of a sheath, embodying the invention, showing the process of inserting a thermometer into the cavity of the sheath.
Figure 2:
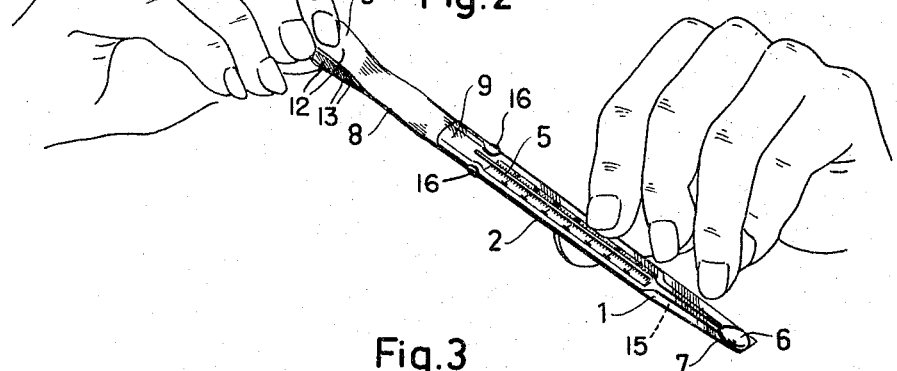
FIGURES 2 and 3 are perspective illustrations of the sheath showing the final steps of securing the thermometer in the sheath prior to taking a patient's temperature.
Figure 3:
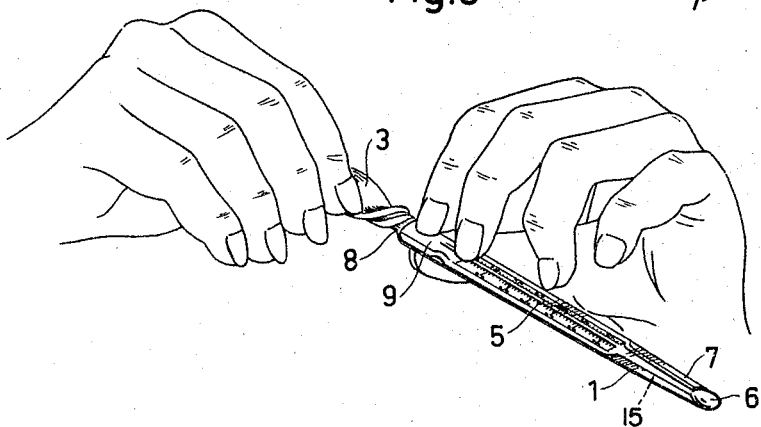

A representative sheath shown in FIGURES 1-6 comprises a body 1 of integral construction. The body 1 is formed of a flexible transparent thermoplastic material which is non-porous and impermeable to bacteria. Moreover, the body 1 is formed by a strip of thin thermoplastic material which when outstretched or extended is substantially symmetrical about a central horizontal bisecting axis A—A (see FIGURE 4).

To form the sheath, one of the free end portions 12 of the strip may be folded about the axis A—A and laid in juxtaposition on top of its corresponding opposite free end 12 so that the lateral mating edges 13 of the two end portions 12 are aligned in parallel relation. The lateral edges 13 are then joined together by a continuous heat seal 2, which may be formed by various processes including welding and hot joining operations such as lap seaming by dielectric heating. The heat seal 2 of U-shaped configuration has its arms terminate at rear end points 8 spaced from the folded or closed rear end; the heat seal 2 extends forwardly from the end points 8 along each of the mating lateral edges 13 and then around the forward ends 7 of the portions 12. In effect the seal 2 forms a cavity 15 and a loop 3 with two lateral openings 4, each providing an access to the cavity 15. Also, the cavity 15 extends from the closed forward end 7 up to the rear points 8, and the forward ends of the loop 3 terminate at the rear end points 8. Alternatively, an elongated sheet of material may be laid in double thickness, and the heat sealed and cut to provide the configuration described.

Two spot welds 16 are spaced some distance forwardly from the rear points 8, each upon an arm of the heat seal 2. The heat seal 2, extending between each spot weld 16 and its corresponding end point 8, is detachable, whereas the remainder of the heat seal 2 fixedly secures the portions 12. This arrangement permits a nurse, during removal of the sheath by spreading the loop 3 outwardly detaching the heat seal 2 down to the spot welds 16, to uncover the handle portion 9 of the thermometer 5.

The forward lateral edges 13 of the sheath body 1 taper inwardly towards the closed forward end 7 so that the temperature sensing bulb 6 will, when contiguous with the closed end 7 of the sheath, be snugly engaged thereby. At this time the closed end 7 will assume a generally conical shape.

In order to insert the thermometer 5, the loop 3 is grasped and moved laterally (see FIGURE 1) and the thermometer inserted into the cavity 15 by being pushed forwardly. When the thermometer 5 is fully inserted in the cavity 15 (see FIGURE 2), the handle portion 9 will be positioned between the rear points 8 and the spot welds 16. By having the cavity 15 extend a greater length than the thermometer 5, an additional safety feature is provided which prevents contamination of the thermometer 5.

Before a patient's temperature is taken, the loop 3 is twisted. This action completely seals the rear end of the cavity 15 and closes the openings 4 preventing communication between the cavity 15 and the sheath surroundings. Thereafter, the patient's temperature is taken and read, and the sheath is removed as depicted by FIGURES 4-6. As shown in FIGURE 4, the loop 3 is spread apart, extending the lateral openings 4. Such action causes a tearing of the heat seal 2 from the end points 8 up to each of the spot welds 16, uncovering the handle 9 of the sheathed thermometer 5. The handle 9 is now grasped, the loop 3 inverted or reversed, and then the loop 3 is pulled progressively forward as shown in FIGURES 5-6 so as to strip the sheath from off the thermometer 5.

The force exerted by pulling the loop 3 will be peripherally distributed about the inverting portion of the body 1 facilitating a rapid sheath removal. The conical forward portion 7 of the sheath functions at this time by snugly engaging the thermometer 5, to prevent an unexpected withdrawal of the thermometer 5 from the sheath.

In FIGURE 7 another representative sheath embodying the invention is shown to comprise an integral body 1' formed of a heat sealable thermoplastic material. This sheath is substantially similar in construction to the previously described sheath, inasmuch as it is formed by a folded symmetrical strip, the lateral edges 10' of the free end portions being parallelly aligned and heat sealed in U-shaped fashion. Here, however, the heat seal 2', along the two lateral edges 10', extends completely from the closed forward end 7' of the sheath up to the closed rear folded end 3'.

A cavity 15' for the thermometer 5', as in the previous embodiment, extends from the forward closed end 7' of the body 1' to a position beyond the rear end 9' of the inserted thermometer 5'. In this embodiment, the cavity 15' can be considered to terminate at a position defined by the extreme forward end point 18' of an opening 11'. Also, the forward end 7' is conical in configuration snugly engaging a bulb 6', thereby preventing sudden thermometer withdrawal.

The opening 11', provided through only one end portion of the body 1', extends in a parallel relation to the adjacent sealed edges 10' and the longitudinal axes of an inserted thermometer 5' from a point adjacent the rear end 3' to the point 18' spaced above the handle portion 9' of a sheathed thermometer 5'. Of course, the opening 11' is of sufficient size so as to facilitate insertion or removal of the thermometer 5'.

In order to insert the thermometer 5', the opening 11' is spread apart presenting an access to the cavity 15', and the thermometer 5' is inserted through the opening 11' into the cavity 15'. The rear end 3' of the body 1' may, after insertion, be twisted closing the opening 11', thereby preventing communication between the cavity 15' and the sheath surroundings. To withdraw the thermometer 5', the opening 11' is again spread apart and the nurse reaches in through the opening 11' to grasp the handle 9'. Now, by pulling the rear end 3' of the body 1' downwardly, the handle 9' is projected out through the opening 11' and the sheath removed from the thermometer 5' in a manner similar to that shown in FIGURES 5-6.

The above described embodiments of the invention are merely exemplary, and those skilled in the art will be able to make modifications and variations in them without departing from the spirit and scope of the invention. For example, while the sheaths have been shown to be constructed of thermoplastic material, other transparent thin plastic material, such as artificial or natural rubber may also be used. Further, the sheath only has to be transparent in a position co-extensive with the indicating scale of the thermometer. Still other means than the illustrated conical section 7 may be provided for securing a thermometer within its cavity to prevent an unexpected withdrawal of the thermometer. For instance, a thread may be included which is fixed to the closed forward end of the body and extends rearwardly to a position where it may be grasped along with the handle end of the thermometer. Therefore, all such modifications and variations are intended to be included within the scope of the invention as defined in the appended claims.

I claim:
1. A disposable protective sheath for thermometers, adapted to be used while taking a patient's temperature, comprising a body forming a thermometer receiving cavity which is dimensioned to receive substantially the entire length of an inserted thermometer, said body having a closed forward end contiguous with the temperature sensitive end of said thermometer and having a closed rear end, said body being formed of a thin flexible material readily conformable to the contours of the thermometer surface and at least one closeable opening formed in said body adjacent said rear end susceptible of being sealed to prevent communication between said receiving cavity and the sheath surroundings and being of sufficient size to permit access to said cavity for insertion and removal of a thermometer.

2. A protective sheath according to claim 1, wherein said closed rear end is a loop defining two lateral openings, each said opening providing an access to said cavity, the forward ends of said loop terminating at the rear end of said cavity.

3. A protective sheath according to claim 1, wherein the forward end of said opening is spaced above the handle end of said thermometer.

4. A protective sheath according to claim 3, wherein said body includes means for holding said closed end adjacent said thermometer for facilitating stripping the sheath from off said inserted thermometer by preventing a sudden withdrawal of said thermometer from said cavity.

5. A protective sheath according to claim 4, wherein said holding means is provided by said body being conically contoured to snugly engage the temperature sensitive end of said inserted thermometer.

6. A disposable sheath for thermometers which is adapted to be removed from a sheathed thermometer by being progressively stripped off from the handle end of the thermometer towards the temperature sensitive end of the thermometer, comprising a folded strip of thin flexible material having a folded end and forward free end portions in juxtaposition with mating lateral edges disposed in parallel relation, a continuous sealing joint of U-shaped configuration connecting said end portions, said sealing joint having two rear end points terminating at positions spaced from said folded end and extending forwardly from each of said end points along said mating lateral edges and around said free ends of said portions to thereby provide the sheath having a forward closed end, a cavity formed therein and extending between said closed forward end and said rear end points, and a loop at its rear end having two lateral openings providing access to said cavity, said cavity having a greater longitudinal extent than an inserted thermometer.

7. A disposable sheath according to claim 6, wherein said body includes means for holding said closed end adjacent said thermometer for facilitating stripping the sheath from off said inserted thermometer by preventing a sudden withdrawal of said thermometer from said cavity.

8. A disposable sheath according to claim 7, wherein said holding means is provided by said body being conically contoured to snugly engage the temperature sensitive end of said inserted thermometer.

9. A disposable sheath according to claim 8, wherein said joint is detachable from each of said rear end points to a position defined by a spot weld.

10. A disposable sheath according to claim 9 wherein said body is formed of a thermoplastic material and said sealing joint is a heat seal.

11. A disposable sheath for thermometers which is adapted to be removed from a sheathed thermometer by being progressively stripped off from the handle end of the thermometer towards the temperature sensitive end of the thermometer, comprising a folded strip of thin flexible material having a folded end and forward free end portions in juxtaposition with mating lateral edges disposed in parallel relation, a continuous sealing joint of U-shaped configuration connecting said end portions and extending forwardly along said mating lateral edges up to said folded rear end to thereby provide a cavity, a closeable opening, susceptible of being sealed to prevent communication between said receiving cavity and the sheath surroundings formed in the rear of said body and disposed in parallel relation to the longitudinal axis of an inserted thermometer, said opening being of sufficient size to permit access to said cavity for insertion and removal of a thermometer, that portion of said cavity extending forwardly from said opening having a greater longitudinal extent than said inserted thermometer.

12. A disposable sheath according to claim 11, wherein said body includes means for holding said closed end adjacent said thermometer for facilitating stripping the sheath from off said inserted thermometer by preventing a sudden withdrawal of said thermometer from said cavity.

13. A disposable sheath according to claim 12, wherein said holding means is provided by said body being conically contoured to snugly engage the temperature sensitive end of said inserted thermometer.

14. A disposable sheath according to claim 13, wherein said body is formed of a thermoplastic material and said sealing joint is a heat seal.

References Cited by the Examiner

UNITED STATES PATENTS

| 2,969,141 | 1/1961 | Katzin | 206—16.5 |
| 2,998,880 | 9/1961 | Ladd | 206—56 X |

FOREIGN PATENTS

| 1,083,351 | 6/1954 | France. |
| 989,043 | 4/1965 | Great Britain. |

THERON E. CONDON, *Primary Examiner.*
J. M. CASKIE, *Assistant Examiner.*